H. C. MUSTIN.
SIGHTING TELESCOPE FOR INDICATING SHIP'S OSCILLATION.
APPLICATION FILED JULY 1, 1905. RENEWED NOV. 15, 1907.
922,938.
Patented May 25, 1909.
2 SHEETS—SHEET 2.
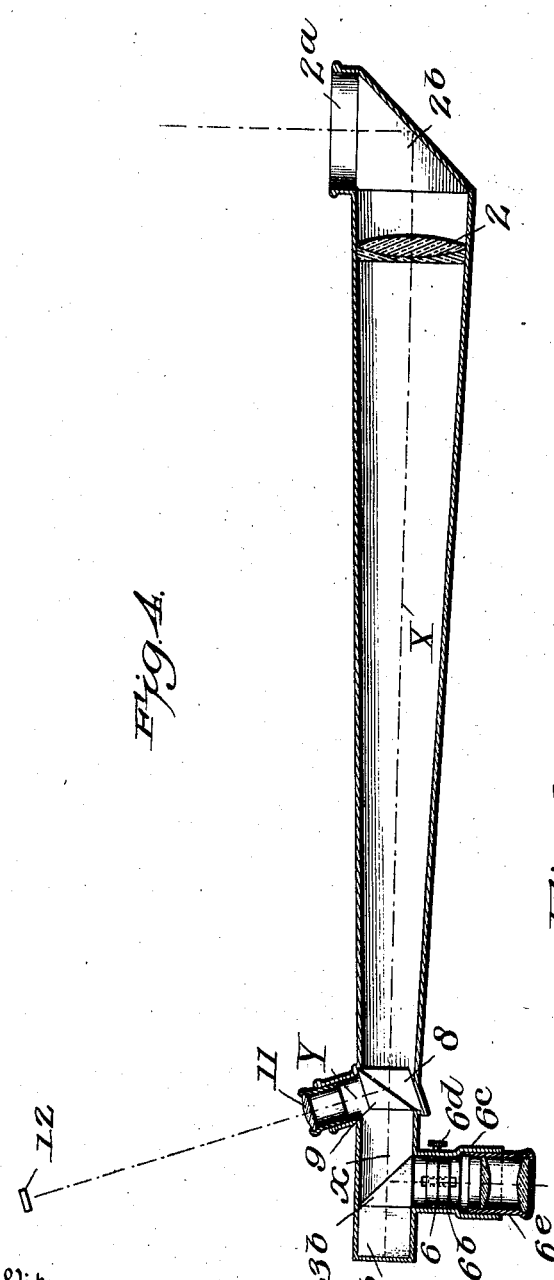
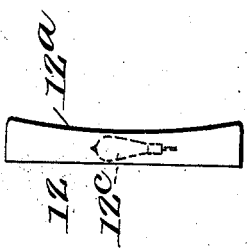
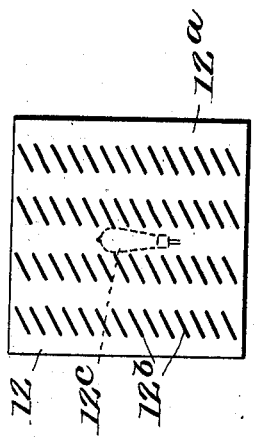
Witnesses
Inventor
H. C. Mustin.
his Attorneys

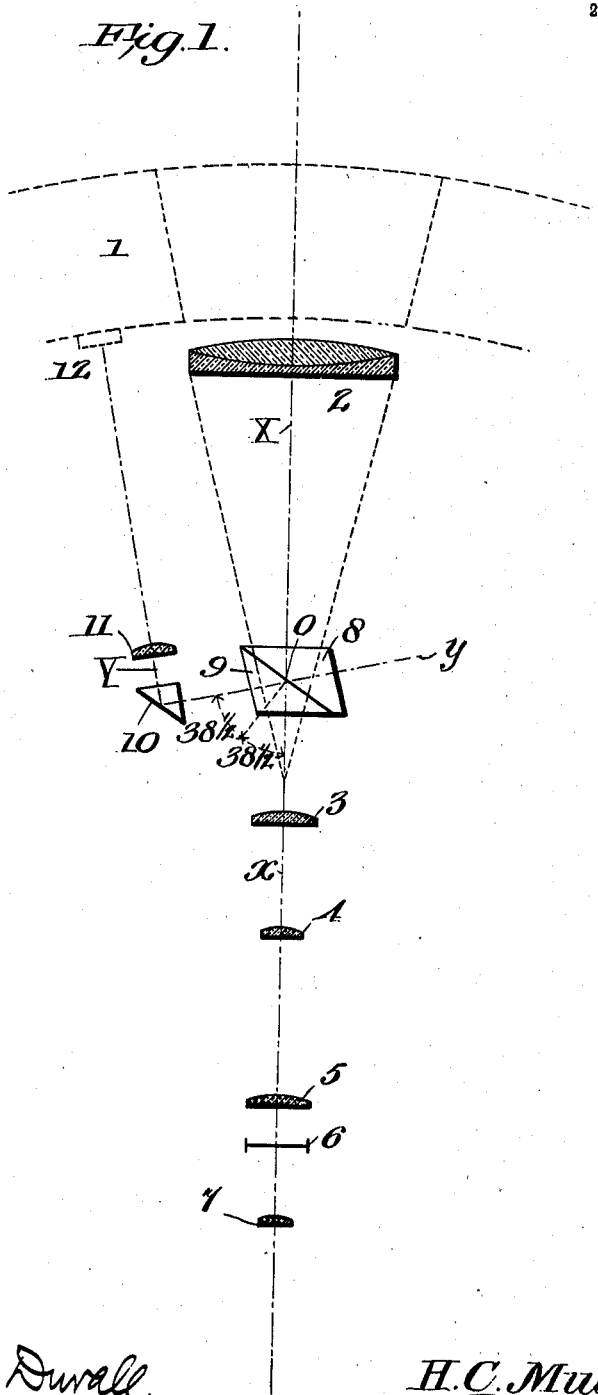

UNITED STATES PATENT OFFICE.

HENRY C. MUSTIN, OF THE UNITED STATES NAVY.

SIGHTING-TELESCOPE FOR INDICATING SHIPS' OSCILLATIONS.

No. 922,938.          Specification of Letters Patent.          Patented May 25, 1909.

Application filed July 1, 1905, Serial No. 267,934. Renewed November 15, 1907. Serial No. 402,328.

*To all whom it may concern:*

Be it known that I, HENRY C. MUSTIN, a citizen of the United States, and a lieutenant in the U. S. Navy, a resident of Germantown, in the county of Philadelphia and State of Pennsylvania, and at present stationed at Washington, District of Columbia, have invented certain new and useful Improvements in Sighting-Telescopes for Indicating Ships' Oscillations, and I do hereby declare the following to be a full, clear, and exact description of the invention, such as will enable others skilled in the art to which it appertains to make and use the same.

This invention relates to an improved construction of telescopes adapted to receive and project rays, from a point outside of the normal field of view, within the telescope tube in such manner that the image of the secondary object is positioned on the image of the primary object.

The invention further resides in the application of an instrument of this character associated with a particular fixed secondary object, the combination being particularly applicable for use as an ordnance sight on board ship, whereby, in operation, the oscillation of the ship will be indicated on the image of the primary object or target formed within the telescope tube so that the "gun-pointer" can clearly determine the approach of the end and the end of the ship's oscillation, and thus regulate the time of firing.

It is well known that in naval gunnery the image of the target, sea and sky, seen in the telescope tube has an apparent vertical motion due to rolling or pitching of the ship on which the telescope is situated. Now, so long as the elevating gear of the gun is stopped, the gun-pointer, at the telescope, is informed of the direction and speed of this apparent motion by means of the cross wires which are in the same plane in the telescope as the image of the target. Apparently this image alternately rises above and falls below the horizontal cross wire at a speed which is governed by the angle of roll or angle of pitching, or both combined. Toward the end of a rolling or pitching oscillation of the ship, the apparent vertical speed of the target slows down and at the end of an oscillation the target has no apparent vertical motion. Thus the horizontal cross wire gives an exact indication of the ship's oscillation so long as the gun and consequently the telescope, is not moved vertically with reference to the ship, and this is the only indication of vertical apparent motion of the target.

It is generally desirable to fire at the end of the ship's oscillation in order to avoid vertical errors in firing. That is to say the intersection of the cross wires must be brought on the target image at the instant apparent vertical motion has ceased, and the gun fired then. Thus the intersection of the cross wires must be kept in the vicinity of the target image and to do this requires motion of the elevating gear of the gun. But as soon as the elevating gear of the gun is moved, the telescope moves with it vertically, and consequently the horizontal cross wire (reference for apparent vertical motion of the target) takes up a vertical motion. The gun-pointer then has to get his idea of the approach of the end and the end of the ship's oscillation by comparing the apparent motion of the image of the target with the actual motion of the cross wires. Since neither of these motions is at a constant speed it is very difficult for the gun-pointer to note the approach of the end of the ship's oscillation, and consequently he is likely to miss the opportunity of bringing cross wires' intersection on the target at the instant the ship's oscillation stops.

The object of this invention is to project on or near the image of the target an indicator which will inform the gun-pointer of the approach of the end and the end of the ship's oscillation. This may be accomplished by the use of an auxiliary objective adapted to receive the rays from an object or indicator adapted to be fixed vertically with relation to the ship, and preferably located on the inside wall of the turret or on any other suitable support movable with the gun platform when a turret is not used, the projected rays from the second objective being suitably deflected to the eye piece by a combination of prisms or other reflecting surfaces hereinafter referred to.

To more fully describe the invention and the particular features of novelty embodied in the claims, reference is had to the accompanying drawings illustrating an application of the same, in which like reference characters designate the same parts in the several views, and in which, Figure 1 is a diagrammatic view illustrating an application of the invention. Fig. 2 is a front view of the preferred type of indicator. Fig. 3 is a side elevation of same, and Fig. 4 is a longitudinal transverse section through an angular sight telescope with my present invention applied thereto, the arrangement of prisms being shown in plan.

1 designates a ship's turret or similar protective guard.

2 designates the objective, 3 the first erecting lens, 4 the second erecting lens, 5 the field lens, 6 the cross wires, and 7 the eye lens of an ordinary telescope. Between the objective 2 and the erecting lenses are a pair of adjacently disposed prisms 8 and 9 having parallel faces, the two prisms forming substantially a parallelogrammatic figure.

10 is a totally reflecting prism disposed adjacent said combined prisms and adapted to receive the rays from the auxiliary objective 11 which latter may be mounted in an adjustable tube member to properly bring the secondary object or indicator in focus on the real image.

12 designates the secondary object or indicator before referred to. This indicator 12, as shown in Figs. 2 and 3, is preferably in the nature of a box having a front face 12ª of an opaque material curved to form an arc with the pivotal axis of the telescope, and provided with a plurality of slanting slots 12ᵇ arranged in rows and closed by any suitably colored translucent material. Within the box is arranged an electric bulb or bulbs 12ᶜ or any other lighting medium.

Letting X designate the optical axis of the main telescope prior to the entry of the rays into the prisms 8 and 9, and x the same axis after the emergence of the rays from said prisms, and letting Y designate the optical axis of the secondary objective, then the rays of light entering the main objective 2 pass through the prism 8 to the point O and striking the lower face of that prism at an angle greater (or at an angle with the normal less) than the critical angle of glass, there is only a partial reflection of the rays along the line y, the body of the rays being refracted at the point O into the prism 9 where they are again refracted, emerging from this latter prism substantially in alinement to their direction of entry into the first prism. The rays from the indicator 12 are projected in the direction of the axis Y and entering the prism 9 at right angles to its side surface, strikes the upper surface of said prism at the point O, the angle of incidence being less than the critical angle of glass and there is therefore a partial reflection of the rays in the direction of x, the greater portion of the rays being diverted by refraction and passing through the prism 8 substantially as indicated at y. It will thus be seen that the secondary object or indicator 12 will not be so intensified on the real image formed at 6, owing to the loss of the greater portion of the rays, and it is for this purpose particularly that I use the special form of indicator, as from experiment it has been found that an illuminated suitably colored object will show up very clearly even on the brightest day. It is obvious, however, that any form of indicator might be used under certain conditions.

In the arrangement shown in Fig. 4 wherein is illustrated a telescope as before mentioned having an angular line of sight, and preferably of the construction shown in my U. S. Patent, No. 778,694 of December 27, 1904, the prism 10 is done away with, the secondary objective 11 in this construction, as well as the main objective opening 2ª, is disposed transversely of the main optical axis, and the erecting lenses are also dispensed with, being replaced by the combination of prisms 3ᵇ and 4ᵇ, 2ᵇ in this construction being a total reflecting prism projecting the rays from the objective opening to the objective lens 2. The cross wires 6 in this construction as described in my patent above referred to are preferably mounted in an adjustable sleeve 6ª located within the eye tube 6ᶜ and operated by a rack and pinion construction 6ᵈ. 6ᵉ designates an eye piece with the usual magnifying lenses. The passage of the rays in this construction will be apparent from the description with reference to Fig. 1.

In operation the effect of the use of the indicator 12 and its projection within the telescope, as heretofore explained, is the same as if the indicator was an object, theoretically speaking, projected on the target and moving thereon in a degree corresponding with the oscillation of the ship containing the instrument, hence as the ship approximates the end of its oscillation, the moving object slows down also so that the "gun-pointer" at the telescope will be positively advised of the approach of the end and the end of the oscillation and the elevating gear can be operated accordingly.

As before mentioned, any suitable indicator may be used, the construction in Figs. 2 and 3 being preferable for the reason stated and the particular disposition of the slots 12ᵇ thereon are placed diagonally so that they will not be confused with the cross wires.

It will be understood that I do not limit myself to the exact details as shown herein, the same, for the purpose of illustration only, designating a preferred embodiment of the invention.

What I claim is:

1. In a sighting telescope, the combination with a main objective, erecting means and eye lens, of means for projecting, into the telescope, a secondary object located out of the normal field of the telescope, comprising a reflector located within the telescope tube and so disposed with relation to the objective as to permit of the passage of the rays therefrom through said reflector, and auxiliary means for projecting the rays from said secondary object to said reflector at an angle of incidence less than the critical angle of glass.

2. In a sighting telescope, the combination with a main objective, erecting means, and eye lens, of means for projecting, into the telescope, a secondary object located out of the normal field of the telescope, comprising a reflector located within the telescope tube between the objective and erecting means and so disposed with relation to the objective as to permit of the passage of the rays therefrom through said reflector, and auxiliary means for projecting the rays from said secondary object to said reflector at an angle of incidence less than the critical angle of glass.

3. In a sighting telescope, the combination with a main objective, erecting means and eye lens, of means for projecting, into the telescope, a secondary object located out of the normal field of the telescope, comprising an auxiliary objective and a pair of prisms each having one of their faces disposed substantially at right angles to the optical axis of the main and auxiliary objectives, respectively, and opposed parallel faces disposed at angles, to said optical axes, greater than the critical angle of glass.

4. In a sighting telescope for marine gunnery, the combination with a sighting telescope, of reflecting means associated therewith for indicating, in connection with the objects viewed the oscillation of the ship.

5. In a sighting telescope for marine gunnery, the combination with a sighting telescope, of reflecting means associated therewith for indicating, within the telescope tube, and in connection with the objects viewed, the oscillation of the ship.

6. In a sighting telescope for marine gunnery, the combination with a sighting telescope, of means associated therewith for indicating the oscillation of the ship, comprising a vertically fixed indicator carried by the ship, and means for projecting the image of said fixed indicator into the telescope.

7. In a sighting telescope for marine gunnery, the combination with a sighting telescope, of a vertically fixed indicator carried by the ship, a reflector located within the telescope tube and so disposed with relation to the objective as to permit of the passage of the rays therefrom through said reflector, and auxiliary means for projecting the rays from said indicator to said reflector, at an angle of incidence less than the critical angle of glass for projecting an image of said indicator within the telescope to indicate the oscillation of the ship.

8. In a sighting telescope for marine gunnery, the combination with a sighting telescope provided with a main objective, erecting means and eye lens, of a vertically fixed indicator carried by the ship located out of the normal field of the telescope, an auxiliary objective, and a pair of prisms each having one of their faces disposed at substantially right angles to the optical axis of the main and auxiliary objectives, respectively, and opposed parallel faces disposed at angles, to said optical axes, greater than the critical angle of glass for projecting an image of said indicator within the telescope tube to indicate the oscillation of the ship.

9. In a sighting telescope for marine gunnery, the combination with a sighting telescope, of an indicator carried by the ship in a vertically fixed position and comprising an illuminated object, and means for projecting the image of said fixed indicator into the telescope tube for indicating the oscillation of the ship.

10. In a sighting telescope for marine gunnery, the combination with a sighting telescope, of an indicator separate from said telescope and having a face of opaque material provided with a plurality of slots therein and illuminating means therefor, and means for projecting the image of said indicator into the telescope tube for indicating the oscillation of the ship.

11. In a sighting telescope for marine gunnery, the combination with a sighting telescope, of an indicator carried by the ship having a face of opaque material, provided with a plurality of slots and illuminating means therefor, and means for projecting the image of said indicator into the telescope for indicating the oscillation of the ship.

12. In a sighting telescope for marine gunnery, the combination with a sighting telescope, of an indicator carried by the ship having an opaque curved face provided with a plurality of diagonal slots and means for illuminating same, and means for projecting an image of said indicator into the telescope tube for indicating the oscillation of the ship.

In testimony whereof, I affix my signature, in presence of two witnesses.

HENRY C. MUSTIN.

Witnesses:
  MARY B. SIMPSON,
  ELLA M. BRANDT.